United States Patent
Aoki et al.

(10) Patent No.: US 7,696,377 B2
(45) Date of Patent: Apr. 13, 2010

(54) STABILIZER AND METHOD FOR STABILIZING HYDROXYLAMINE, AND STABILIZED HYDROXYLAMINE SOLUTION

(75) Inventors: Takanori Aoki, Kawasaki (JP); Toshitaka Hiro, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 223 days.

(21) Appl. No.: 11/815,826

(22) PCT Filed: Oct. 19, 2006

(86) PCT No.: PCT/JP2006/321314

§ 371 (c)(1), (2), (4) Date: Aug. 8, 2007

(87) PCT Pub. No.: WO2007/049663

PCT Pub. Date: May 3, 2007

(65) Prior Publication Data

US 2009/0043125 A1    Feb. 12, 2009

(30) Foreign Application Priority Data

Oct. 26, 2005   (JP) .............................. 2005-311506

(51) Int. Cl.
*C07C 229/00* (2006.01)
*C07C 239/00* (2006.01)

(52) U.S. Cl. ........................................ 562/448; 564/301

(58) Field of Classification Search ....................... None
See application file for complete search history.

(56) References Cited

U.S. PATENT DOCUMENTS

| 5,808,150 A | 9/1998 | Michelotti |
| 5,906,805 A | 5/1999 | Chang et al. |
| 2003/0026751 A1 | 2/2003 | Weber et al. |

FOREIGN PATENT DOCUMENTS

| GB | 2422780 A | * | 8/2006 |
| JP | 9-309708 A | | 12/1997 |
| WO | 98/49099 A1 | | 11/1998 |
| WO | 01/62710 A1 | | 8/2001 |

* cited by examiner

*Primary Examiner*—Paul A Zucker
(74) *Attorney, Agent, or Firm*—Sughrue Mion, PLLC

(57) ABSTRACT

It is the objective to provide a method of stabilizing hydroxylamine at a high temperature and a high concentration or in a case that metal impurities such as Fe got mixed therewith, and a stabilized hydroxylamine solution. A method for stabilizing hydroxylamine related to the present invention is characterized by adding ethylenediamine-N,N'-di(o-hydroxyphenylacetic acid) as a preservation stabilizer.

3 Claims, No Drawings

STABILIZER AND METHOD FOR STABILIZING HYDROXYLAMINE, AND STABILIZED HYDROXYLAMINE SOLUTION

TECHNICAL FIELD

The present invention is related to a stabilizer and a method for stabilizing hydroxylamine, and a stabilized hydroxylamine solution.

BACKGROUND ART

Hydroxylamines are used in wide industrial applications such as a raw material of a medical and agricultural chemical intermediate, a reducing agent, a treatment agent for surface of metal, a fiber treatment and dyeing. However, free hydroxylamine has extremely unstable characteristics, for instance, it is easily decomposed under the conditions of an existence of metal ions (particularly heavy metal ions), a high temperature or a high concentration. Consequently, a salt of hydroxylamine, which is comparatively stable, is manufactured and used in general.

However, hydroxylamine is suitable for many applications rather than a salt of hydroxylamine. In addition, in many cases, handling of a hydroxylamine aqueous solution at a high temperature or a high concentration is required. Accordingly, a trial to stabilize hydroxylamine under the conditions of a high temperature, a high concentration and metal impurities such as Fe getting mixed with has been carried out.

For instance, the patent document 1 (U.S. Pat. No. 5,808,150) describes a stabilizing method of adding diethylenetriamine-pentaacetic acid or triethylenetetramine-hexaacetic acid as a stabilizer into a solution containing hydroxylamine.

However, there is a problem in which a hydroxylamine solution that contains diethylenetriamine-pentaacetic acid or triethylenetetramine-hexaacetic acid as a stabilizer has an insufficient effect for suppressing a decomposition of hydroxylamine at a high temperature or a high concentration or in a case that metal impurities such as Fe got mixed with.

Patent Document 1: U.S. Pat. No. 5,808,150

DISCLOSURE OF THE INVENTION

Problems to be Solved by the Invention

The objective of the present invention is to provide a stabilizer and a method for stabilizing hydroxylamine, and a stabilized hydroxylamine solution.

Means for Solving the Problems

The present inventors have researched the above problem to solve it with might and main. As a result, the present inventors have found that a hydroxylamine solution can be stabilized by adding ethylenediamine-N,N'-di(o-hydroxyphenylacetic acid) into the hydroxylamine solution, and achieved the present invention. The present inventors have found the present knowledge for the first time.

The present invention has been made on the basis of the above knowledge and is related to the following (1) to (3).
(1) A method for stabilizing hydroxylamine characterized by adding ethylenediamine-N,N'-di(o-hydroxyphenylacetic acid) into a hydroxylamine solution as a preservation stabilizer.
(2) A stabilized hydroxylamine solution characterized by comprising hydroxylamine and ethylenediamine-N,N'-di(o-hydroxyphenylacetic acid).
(3) A stabilizer of hydroxylamine characterized by ethylenediamine-N,N'-di(o-hydroxyphenylacetic acid) as an effective component.

Effect of the Invention

The present invention enables a hydroxylamine solution to be stabilized, and a stabilized hydroxylamine solution can be obtained.

BEST MODE OF CARRYING OUT THE INVENTION

The following describes in detail a stabilizer and a method for stabilizing a hydroxylamine solution, and a stabilized hydroxylamine solution related to the present invention.

The stabilization of hydroxylamine related to the present invention is a method for stabilizing hydroxylamine by adding ethylenediamine-N,N'-di(o-hydroxyphenylacetic acid) into a hydroxylamine solution as a preservation stabilizer.

A stabilized hydroxylamine solution related to the present invention comprises hydroxylamine and ethylenediamine-N,N'-di(o-hydroxyphenylacetic acid).

A stabilizer of hydroxylamine related to the present invention is characterized by ethylenediamine-N,N'-di(o-hydroxyphenylacetic acid) as an effective component.

The method for stabilizing hydroxylamine related to the present invention can suppress the decomposition of hydroxylamine at a high temperature or a high concentration or in a case that metal impurities such as Fe getting mixed with, by adding ethylenediamine-N,N'-di(o-hydroxyphenylacetic acid) into a hydroxylamine solution.

While ethylenediamine-N,N'-di(o-hydroxyphenylacetic acid) that is used in the method related to the present invention is not restricted in particular in a case that it is available in the marketplace or industrially, the compound containing less metal impurities is preferably used. This is because an existence of metal impurities accelerates the decomposition of hydroxylamine in some cases. In addition, high-purity hydroxylamine with less metal impurities is preferable for electronic industries. The hydrate of ethylenediamine-N,N'-di(o-hydroxyphenylacetic acid) can also be used.

A mass ratio of ethylenediamine-N,N'-di(o-hydroxyphenylacetic acid) to hydroxylamine (ethylenediamine-N,N'-di (o-hydroxyphenylacetic acid)/hydroxylamine) is suitably in the range of $1.0 \times 10^{-9}$ to 1.0, preferably in the range of $1.0 \times 10^{-8}$ to 0.1. In a case that the above mass ratio is less than $1.0 \times 10^{-9}$, the effect of suppressing the decomposition reaction of hydroxylamine cannot be obtained in some cases. In a case that the above mass ratio is larger than 1.0, it is necessary to remove or recover excess ethylenediamine-N,N'-di(o-hydroxyphenylacetic acid) in some cases.

As the method of adding ethylenediamine-N,N'-di(o-hydroxyphenylacetic acid) into hydroxylamine, ethylenediamine-N,N'-di(o-hydroxyphenylacetic acid) can be added in a solid state, or can be added after dissolved or suspended into a solvent. As such a solvent, water and/or an organic solvent can be used. As an organic solvent, for instance, there are mentioned hydrocarbon, ether, ester and alcohol, which are capable of dissolving ethylenediamine-N,N'-di(o-hydroxyphenylacetic acid). However, the organic solvent is not restricted to the above solvents unless the solvents have bad effect in its application. Among the above solvents, water and/or alcohol is preferably used. Moreover, it can be added after dissolved into a hydroxylamine solution. Furthermore, a solvent can be selected from same or different types of solutions as a hydroxylamine solution depending on conditions and applications. It is preferably dissolved into same types of solvents as a hydroxylamine solution and then added. An amount of a solvent can be selected properly.

While hydroxylamine that can be used in the stabilizing method related to the present invention is not restricted in particular in the case in which it is available in the marketplace or available industrially, it preferably contains less metal impurities. This is because an existence of metal impurities accelerates the decomposition of hydroxylamine in some cases. In addition, high-purity hydroxylamine with less metal impurities is preferable for electronic industries.

In the stabilizing method related to the present invention, hydroxylamine can be used in a solid state, or can be used after dissolved into a solvent. As such a solvent, water and/or an organic solvent can be used. As an organic solvent, for instance, there are mentioned hydrocarbon, ether, ester and alcohol. However, the organic solvent is not restricted to the above solvents unless the solvents have bad effect in its application. Among the above solvents, water and/or alcohol is preferably used.

A concentration of hydroxylamine in a hydroxylamine solution can be adjusted by properly selecting the amount of a solvent. While a concentration of hydroxylamine is not restricted in particular, it is preferably in the range of 0.1 to 90 mass %, more preferably in the range of 1.0 to 70 mass %.

For instance, hydroxylamine that can be used in the stabilization related to the present invention can be manufactured by the following method.

Reaction Process:

The method for manufacturing hydroxylamine includes, for instance, a reaction process in which hydroxylamine is obtained by reacting a salt of hydroxylamine with an alkali compound.

As a salt of hydroxylamine, there are mentioned a salt of inorganic acid such as sulfate, hydrochloride, nitrate, phosphate, hydrobromide, sulfite, phosphate, perchlorate, carbonate and hydrogen carbonate of hydroxylamine, and a salt of organic acid such as formate, acetate and propionate. Among the above, at least a kind of salt that is selected from a group composed of sulfate ($NH_2OH \cdot \frac{1}{2}H_2SO_4$), hydrochloride ($NH_2OH \cdot HCl$), nitrate ($NH_2OH \cdot HNO_3$) and phosphate ($NH_2OH \cdot \frac{1}{3}H_3PO_4$) of hydroxylamine is preferable.

While a salt of hydroxylamine is not restricted in particular in the case in which it is available in the marketplace or available industrially, the salt of hydroxylamine containing less metal impurities is preferably used. This is because an existence of metal impurities accelerates the decomposition of a salt of hydroxylamine or formed hydroxylamine in some cases. However, a salt of hydroxylamine can contain impurities in the case in which the impurities do not affect a decomposition of a salt of hydroxylamine or hydroxylamine and can be removed in the process such as a purification or have no problems in use of hydroxylamine.

A salt of hydroxylamine can be used in a solid state, or can be used after dissolved or suspended into a solvent. As such a solvent, water and/or an organic solvent can be used. As an organic solvent, for instance, there are mentioned hydrocarbon, ether and alcohol. However, the organic solvent is not restricted to the above in a case that its reaction is not affected. Among the above solvents, a solvent containing water and/or alcohol is preferably used. Moreover, at least a part of filtrate from which an insoluble salt or the like formed by a reaction has been separated can also be used as a solvent.

An amount of the above solvent can be properly selected depending on the conditions such as an amount and a reaction temperature of a salt of hydroxylamine to be used. In general, a mass ratio of a solvent to a salt of hydroxylamine (solvent/salt of hydroxylamine) is in the range of 0.1 to 1000, preferably in the range of 1 to 100.

As an alkali compound, at least a kind of compound that is selected from a group composed of a compound containing an alkali metal, a compound containing an alkaline earth metal, ammonia and amine is preferable.

As a compound containing an alkali metal, there are mentioned an oxide, a hydroxide and a carbonate of lithium, sodium, potassium, rubidium or cesium, and the hydroxide or carbonate of sodium or potassium is preferably used.

As a compound containing an alkaline earth metal, there are mentioned an oxide, a hydroxide and a carbonate of beryllium, magnesium, calcium, strontium or barium, and the oxide or hydroxide of magnesium, calcium, strontium or barium is preferably used.

Ammonia can be used as a gas and as a solvent into which ammonia has been dissolved, that is, an ammonia aqueous solution.

As amine, primary amine, secondary amine or tertiary amine can be used. In addition, amine can be monoamine, polyamine such as diamine and triamine, which contain at least two amino groups in a molecule, or cyclic amine.

As monoamine, for instance, there are mentioned methylamine, dimethylamine, trimethylamine, ethylamine, diethylamine, triethylamine, n-propylamine, di-n-propylamine, tri-n-propylamine, i-propylamine, di-i-propylamine, tri-i-propylamine, n-butylamine, di-n-butylamine, tri-n-butylamine, i-butylamine, di-i-butylamine, tri-i-butylamine, sec-butylamine, di-sec-butylamine, tri-sec-butylamine, tert-butylamine, di-tert-butylamine, tri-tert-butylamine, allylamine, diallylamine, triallylamine, cyclohexylamine, dicyclohexylamine, tricyclohexylamine, n-octylamine, di-n-octylamine, tri-n-octylamine, benzylamine, dibenzylamine, tribenzylamine, diaminopropylamine, 2-ethylhexylamine, 3-(2-ethylhexyloxy) propylamine, 3-methoxypropylamine, 3-ethoxypropylamine, 3- (diethylamino) propylamine, bis (2-ethylhexyl) amine, 3-(dibutylamino) propylamine, α-phenylethylamine, β-phenylethylamine, aniline, N-methylaniline, N,N-dimethylaniline, diphenylamine, triphenylamine, o-toluidine, m-toluidine, p-toluidine, o-anisidine, m-anisidine, p-anisidine, o-chloroaniline, m-chloroaniline, p-chloroaniline, o-bromoaniline, m-bromoaniline, p-bromoaniline, o-nitroaniline, m-nitroaniline, p-nitroaniline, 2,4-dinitroaniline, 2,4,6-trinitroaniline, p-aminobenzoic acid, sulfanilic acid, sulfanilamide, monoethanolamine, diethanolamine and triethanolamine.

As diamine, for instance, there are mentioned 1,2-diaminoethane, N,N,N',N'-tetramethyl-1,2-diaminoethane, N,N,N',N'-tetraethyl-1,2-diaminoethane, 1,3-diaminopropane, N,N,N',N'-tetramethyl-1,2-diaminopropane, N,N,N',N'-tetraethyl-1,2-diaminopropane, 1,4-diaminobutane, N-methyl-1,4-diaminobutane, 1,2-diaminobutane, N,N,N',N'-tetramethyl-1,2-diaminobutane, 3-aminopropyldimethylamine, 1,6-diaminohexane, 3,3-diamino-N-methyldipropylamine, 1,2-phenylenediamine, 1,3-phenylenediamine, 1,4-phenylenediamine and benzidine.

As triamine, for instance, there are mentioned 2,4,6-triaminophenol, 1,2,3-triaminopropane, 1,2,3-triaminobenzene, 1,2,4-triaminobenzene and 1,3,5-triaminobenzene.

As tetramine, for instance, there are mentioned β,β',β"-triaminotriethylamine.

As cyclic amine, for instance, there are mentioned pyrrole, pyridine, pyrimidine, pyrrolidine, piperidine, purine, imidazole, oxazole, thiazole, pyrazole, 3-pyrroline, quinoline, isoquinoline, carbazol, piperazine, pyridazine, 1,2,3-triazine, 1,2,4-triazine, 1,3,5-triazine, 1,2,3-triazole, 1,2,5-triazole, 1,2,4-triazole, 1,3,4-triazole and morpholine.

Amine that can be used as an alkali compound is not restricted to the above compounds, and can be an asymmetric compound with different kinds of substitutional groups such as ethylmethyl amine. Moreover, amine can be used individually, and can also be used in combination with two kinds or more.

While an alkali compound is not restricted in particular in a case that it is available in the marketplace or industrially, the compound containing less metal impurities is preferably used. The same goes for a salt of hydroxylamine.

An equivalent ratio of an alkali compound to a salt of hydroxylamine (alkali compound/salt of hydroxylamine) is suitably in the range of 0.1 to 100, preferably in the range of 0.5 to 10, more preferably in the range of 1 to 2. In a case that an equivalent of a salt of hydroxylamine is 1, an equivalent of an alkali metal, an alkaline earth metal and ammonia is calculated as 1, 2 and 1, respectively. In the case of amine, an equivalent of monoamine and diamine is calculated as 1 and 2, respectively In a case that the above equivalent ratio is larger than 100, a problem occurs in some cases, for instance, hydroxylamine is decomposed due to excess alkali compounds, and it is necessary to recover many unreacted alkali compounds. On the other hand, in a case that the equivalent ratio is less than 0.1, a problem occurs in some cases, for instance, it is necessary to recover a large amount of salt of unreacted hydroxylamine.

An alkali compound can be used after dissolved or suspended into a solvent. As such a solvent, water and/or an organic solvent can be used. As an organic solvent, for instance, there are mentioned hydrocarbon, ether and alcohol. However, the organic solvent is not restricted to the above in the case in which its reaction is not affected. Among the above solvents, water and/or alcohol is preferably used. Moreover, at least a part of filtrate from which an insoluble salt formed by a reaction or the like has been separated can also be used as a solvent.

An amount of the above solvent can be properly selected depending on the conditions such as an amount and a reaction temperature of an alkali compound used. In general, a mass ratio of a solvent to an alkali compound (solvent/alkali compound) is in the range of 0.5 to 1000, preferably in the range of 0.8 to 100.

In a method for manufacturing hydroxylamine, a reaction process in which a salt of hydroxylamine is reacted with an alkali compound to obtain hydroxylamine, a separation process, a purification process, and a concentration process, which are described later, can be carried out in the presence of a stabilizer. As a stabilizer, a known one can be used. For instance, there are mentioned 8-hydroxyquinoline, N-hydroxyethylethylenediamine-N,N,N'-triacetic acid, glycine, ethylenediaminetetraacetic acid, cis-1,2-diaminocyclohexane-N,N,N',N'-tetraacetic acid, trans-1,2-diaminocyclohexane-N,N,N',N'-tetraacetic acid, N,N'-di(2-hydroxybenzyl)ethylenediamine-N,N'-diacetic acid, N-hydroxyethyliminodiacetic acid, N,N'-dihydroxyethylglycine, diethylenetriaminepentaacetic acid, ethylenebis(oxyethylenenitrilo)tetraacetic acid, bishexamethylenetriaminepentaacetic acid, hexamethylenediaminetetraacetic acid, triethylenetetraminehexaacetic acid, tris(2-aminoethyl)aminehexaacetic acid, iminodiacetic acid, polyethyleneimine, polypropyleneimine, o-aminoquinoline, 1,10-phenanthroline, 5-methyl-1,10-phenanthroline, 5-chloro-1,10-phenanthroline, 5-phenyl-1,10-phenanthroline, hydroxyanthraquinone, 8-hydroxyquinoline-5-sulfonic acid, hydroxymethylquinoline, thioglycolic acid, thiopropionic acid, 1-amino-2-mercapto-propionic acid, 2,2-dipyridyl, 4,4-dimethyl-2,2-dipyridyl, ammonium thiosulfate, benzotriazole, flavone, Moline, quercetin, gossypethin, robitinen, rutheolin, fisetin, apigenin, galangine, chrysin, flavonol, pyrogallol, oxyanthraquinone, 1,2-dioxyanthraquinone, 1,4-dioxyanthraquinone, 1,2,4-trioxyanthraquinone, 1,5-dioxyanthraquinone, 1,8-dioxyanthraquinone, 2,3-dioxyanthraquinone, 1,2,6-trioxyanthraquinone, 1,2,7-trioxyanthraquinone, 1,2,5,8-tetraoxyanthraquinone, 1,2,4,5,8-pentaoxyanthraquinone, 1,6,8-dioxy-3-methyl-6-methoxyanthraquinone, quinalizarin, flavan, lactone, 2,3-dihydrohexono-1,4-lactone, 8-hydroxyquinaldine, 6-methyl-8-hydroxyquinaldine, 5,8-dihydroxyquinaldine, anthocyan, pelargonydin, cyanidin, delphinidin, peonidin, petunidin, malvidin, catechin, sodium thiosulfate, nitrilotriacetic acid, 2-hydroxyethyl disulfide, 1,4-dimercapto-2,3-butanediol, thiamine hydrochloride, catechol, 4-t-butyl catechol, 2,3-dihydroxynaphthalene, 2,3-dihydroxybenzoic acid, 2-hydroxypyridine-N-oxide, 1,2-dimethyl-3-hydroxypyridine-4-on, 4-methylpyridine-N-oxide, 6-methylpyridine-N-oxide, 1-methyl-3-hydroxypyridine-2-on, 2-mercaptobenzothiazole, 2-mercaptocyclohexylthiazole, 2-mercapto-6-t-butylcyclohexylthiazole, 2-mercapto-4,5-dimethylthiazoline, 2-mercaptothiazoline, 2-mercapto-5-t-butylthiazoline, tetramethylthiuram disulfide, tetra-n-butylthiuram disulfide, N,N'-diethylthiuram disulfide, tetraphenylthiuram disulfide, thiuram disulfide, thiourea, N,N'-diphenylthiourea, di-o-tolylthiourea, ethylenethiourea, thiocetamide, 2-thiouracil, thiocyanuric acid, thioformamide, thioacetamide, thiopropionamide, thiobenzamide, thionicotinamide, thioacetanilide, thiobenzanilide, 1,3-dimethylthiourea, 1,3-diethyl-2-thiourea, 1-phenyl-2-thiourea, 1,3-diphenyl-2-thiourea, thiocarbazide, thiosemicarbazide, 4,4-dimethyl-3-thiosemicarbazide, 2-mercaptoimidazoline, 2-thiohydantoin, 3-thiourazole, 2-thiouramil, 4-thiouramil, thiopentanol, 2-thiobarbituric acid, thiocyanuric acid, 2-mercaptoquinoline, thiocoumazone, thiocumothiazone, thiosaccharin, 2-mercaptobenzimidazole, trimethyl phosphite, triethyl phosphite, triphenyl phosphite, trimethylphosphine, triethylphosphine and triphenylphosphine. In addition, as a stabilizer, ethylenediamine-N,N'-di (o-hydroxyphenylacetic acid) can also be used.

For the above stabilizer, a stabilizer can be used individually, and can also be used in combination with two kinds or more. The decomposition of hydroxylamine and a salt of hydroxylamine due to metal impurities or the like can be suppressed by adding a stabilizer.

While a stabilizer is not restricted in particular in a case that it is available in the marketplace or available industrially, the stabilizer containing less metal impurities is preferably used. The same goes for a salt of hydroxylamine.

A mass ratio of a stabilizer to a salt of hydroxylamine (stabilizer/salt of hydroxylamine) is suitably in the range of $1.0 \times 10^{-9}$ to 1.0, preferably in the range of $1.0 \times 10^{-8}$ to 0.1. In the case in which the above mass ratio is less than $1.0 \times 10^{-9}$, an effect of suppressing a decomposition reaction of hydroxylamine or a salt of hydroxylamine due to metal impurities cannot be obtained in some cases. In a case that the above mass ratio is larger than 1.0, it is necessary to remove or recover excess stabilizers in some cases.

A stabilizer can be used in a solid state, or can be used after dissolved into a solvent. As such a solvent, water and/or an organic solvent can be used. As an organic solvent, for instance, there are mentioned hydrocarbon, ether, ester and alcohol. However, the organic solvent is not restricted to the above in the case in which its reaction is not affected. Among the above solvents, water and/or alcohol is preferably used.

An amount of the solvent can be properly selected depending on the conditions such as a kind, an amount, and a reaction temperature of a stabilizer to be used.

A preferred reaction process in the method for manufacturing hydroxylamine is as follows. In the reaction process, a salt of hydroxylamine is added to and reacted with a reaction solution in which an alkali compound has been dissolved or suspended into a solvent. As described above, by using a method of adding a salt of hydroxylamine into a reaction solution containing an alkali compound, the resulting hydroxylamine is hard to form a complex with a by-product salt, and is hard to be adsorbed to or incorporated into a by-product insoluble salt.

Moreover, in a case that a salt of hydroxylamine is added to a reaction solution containing an alkali compound, it is preferable to add a salt of hydroxylamine while pH of the reaction liquid is kept to be preferably 7 or higher, more preferably 7.5 or higher, further preferably 8 or higher. By keeping pH of the reaction solution to be in the above range, the resulting hydroxylamine is hard to form a complex with a by-product salt, and is hard to be adsorbed to or incorporated into a by-product insoluble salt.

However, in the reaction process, an alkali compound can be added to and reacted with a reaction solution in which a salt of hydroxylamine has been dissolved or suspended.

Moreover, a reaction process in a method for manufacturing hydroxylamine can also be a reaction process in which a salt of hydroxylamine and an alkali compound are simultaneously supplied and reacted. In such a case, it is preferable to adjust an amount of a salt of hydroxylamine and an alkali compound to be added while pH of the reaction solution is kept to be preferably 7 or higher, more preferably 7.5 or higher, further preferably 8 or higher. A salt of hydroxylamine and an alkali compound can be added in a solid state, or can be added after dissolved or suspended into a solvent. Moreover, in a case that an alkali compound is ammonia and so on, the gas can be introduced.

In a reaction process in manufacture of hydroxylamine, a method of adding a stabilizer is not restricted in particular, and a known method can be used. For instance, a stabilizer can be introduced into a reactor in advance before starting a reaction, or, if necessary, can be added on the way of a reaction. Moreover, a stabilizer, together with an alkali compound and a salt of hydroxylamine, can be added after dissolved or suspended into a solvent.

In the above reaction process, a reaction temperature is preferably in the range of 0 to 80° C., more preferably in the range of 5 to 50° C. In a case that a reaction temperature is higher than 80° C., the problem such as decomposition of hydroxylamine may occur. On the other hand, in a case that a reaction temperature is lower than 0° C., the rate of reaction becomes lower and the problem such as a decrease in productivity may occur.

A reaction temperature can be maintained in a constant range by emitting a reaction heat, which is generated by the reaction of a salt of hydroxylamine with an alkali compound, outside the system by using water, hot water or a heat medium. Moreover, a heat emitted outside the system by using water, hot water or a heat medium can preferably be utilized as a heat source for other facilities.

A reaction process in a method for manufacturing hydroxylamine can be carried out by a known method such as a batch system, a semi-batch system and a continuous system.

Separation Process:

A method for manufacturing hydroxylamine can include, for instance, a process for separating hydroxylamine and an insoluble material.

The insoluble material is, for instance, the insoluble material deposited in the reaction solution in the above reaction process.

As the insoluble material, there are mentioned a salt formed by the reaction of a salt of hydroxylamine with an alkali compound in the above reaction process, a salt of hydroxylamine, an alkali compound and so on.

More specifically, in the case in which a salt formed by a reaction of a salt of hydroxylamine with an alkali compound in the above reaction process, a salt of hydroxylamine, an alkali compound and so on are deposited as insoluble materials when the solubility get beyond the limit, a separation process for separating the insoluble material can be included.

As a separation method, a known method such as filtration, compression, centrifugal separation, sedimentation and floatation can be used. For instance, for a separation method by filtration, any of natural filtration, pressure filtration, and filtration under reduced pressure can be carried out. For a separation by sedimentation, clarification separation or sedimentation concentration can be carried out. For a separation by floatation, pressure floatation or ionization floatation can be carried out.

Hydroxylamine that has adhered to or has been incorporated into the insoluble material can be recovered by washing the insoluble material that has been separated in the separation process.

As a solvent for washing insoluble materials, a solvent that is used in the reaction process can be used, and another solvent can also be used. As such a solvent for washing, water and/or an organic solvent can be used. As an organic solvent, for instance, there are mentioned hydrocarbon, ether, ester, alcohol and so on. However, the organic solvent is not restricted to the above in the case in which the recovery of hydroxylamine is not affected. Among the above solvents, water and/or alcohol is preferably used as a solvent for washing. An amount of a solvent for washing can be properly selected depending on the conditions, such as a kind, the amount, and separation, of insoluble materials.

A temperature in the case in which insoluble materials are separated in the above separation process is preferably in the range of 0 to 80° C., more preferably in the range of 5 to 50° C. In a case that the temperature is higher than 80° C., a problem such as decomposition of hydroxylamine may occur. On the other hand, in a case that the temperature of a reaction solution is lower than 0° C., a problem in which energy required for cooling increases may occur. A part or the entire of filtrate that has separated an insoluble material and/or filtrate that has washed an insoluble material in the above separation process can be used as a solvent that dissolves or suspends a salt of hydroxylamine and/or an alkali compound, which are raw materials for the reaction.

The above separation process is preferably carried out in the presence of a stabilizer of hydroxylamine, similarly to the reaction process. In the separation process, a new stabilizer can be added, or a stabilizer that has been used in the previous process can also be used.

For the above stabilizer, a stabilizer can be selected from same or different types of the stabilizers as those used in the reaction process depending on the conditions and applications. By adding a stabilizer, the side reaction such as decomposition of hydroxylamine due to metal impurities or the like can be suppressed and production efficiency of hydroxylamine can be improved.

An amount of a stabilizer is suitably used in such a manner that a mass ratio of a stabilizer to hydroxylamine (stabilizer/hydroxylamine) is in the range of $1.0 \times 10^{-9}$ to 1.0, preferably in the range of $1.0 \times 10^{-8}$ to 0.1. In a case that the above mass ratio is less than $1.0 \times 10^{-9}$, an effect of suppressing a decomposition reaction of hydroxylamine due to metal impurities cannot be obtained in some cases. In a case that the above mass ratio is larger than 1.0, it is necessary to remove or recover excess stabilizers in some cases.

A separation process in a method for manufacturing hydroxylamine can be carried out by a known method such as a batch system, a semi-batch system and a continuous system.

Purification Process:

A method for manufacturing hydroxylamine includes, for instance, a process for purifying a hydroxylamine solution obtained as described above by an ion exchange.

The method of an ion exchange can be carried out by a known method such as a cation exchange, an anion exchange and a chelate exchange.

The purification by a cation exchange can be carried out by a known method using a strong acid cation exchange resin, a weak acid cation exchange resin or the like. An acid treatment is preferably carried out to the cation exchange resin in advance to make the cation exchange resin to be an H type before being used.

The purification by an anion exchange can be carried out by a known method using a strong basic anion exchange resin, a weak basic anion exchange resin or the like. An alkali treatment is preferably carried out to the anion exchange resin in advance to make the anion exchange resin to be an OH type before being used.

The purification by a chelate exchange can be carried out by a known method using a chelate exchange resin or the like. An acid treatment is preferably carried out to the chelate exchange resin in advance to make the chelate exchange resin to be an H type before being used.

The purification can be carried out by combining a cation exchange, an anion exchange and a chelate exchange. For instance, the anion exchange can be carried out after the cation exchange, or the cation exchange can be carried out after the anion exchange. Moreover, a mono bed resin or a mix bed resin in which a cation exchange resin and an anion exchange resin are mixed can also be used.

A temperature in an ion exchange is preferably in the range of 0 to 70° C., more preferably in the range of 5 to 50° C. In a case that a temperature in an ion exchange is higher than 70° C., a problem such as a decomposition of hydroxylamine may occur. On the other hand, in a case that a temperature in an ion exchange is lower than 0° C., a problem in which energy required for cooling increases may occur.

A part of a hydroxylamine solution obtained in the above purification process can be used as a solvent that dissolves or suspends a salt of hydroxylamine and an alkali compound, which are raw materials for the reaction.

The above purification process is preferably carried out in the presence of a stabilizer of hydroxylamine similarly to the reaction process. In the purification process, a new stabilizer can be added, or a stabilizer that has been used in the previous process can also be used.

For the above stabilizer, a stabilizer can be selected from same or different types of the stabilizers used in the reaction process depending on the conditions and applications. By adding a stabilizer, a side reaction such as the decomposition of hydroxylamine due to metal impurities or the like can be suppressed and production efficiency of hydroxylamine can be improved.

An amount of a stabilizer is suitably used in such a manner that a mass ratio of a stabilizer to hydroxylamine (stabilizer/hydroxylamine) is in the range of $1.0 \times 10^{-9}$ to 1.0, preferably in the range of $1.0 \times 10^{-8}$ to 0.1. In a case that the above mass ratio is less than $1.0 \times 10^{-9}$, an effect of suppressing the decomposition reaction of hydroxylamine due to metal impurities cannot be obtained in some cases. In a case that the above mass ratio is larger than 1.0, it is necessary to remove or recover excess stabilizers in some cases.

The purification process by an ion exchange in a method for manufacturing hydroxylamine can be carried out by a known method such as a batch system, a semi-batch system and a continuous system.

Concentration Process:

A method for manufacturing hydroxylamine includes, for instance, a process for concentrating hydroxylamine at a column bottom section by distillation.

The method of distillation can be carried out by a known method such as simple distillation, multistage distillation, steam distillation and flash distillation.

For instance, a hydroxylamine solution with high hydroxylamine concentration can be obtained from the column bottom section by simple distillation or multistage distillation.

As a distilling column, a general plate column such as a bubble cap tray tower and a mesh plate column, or a general filling such as a Raschig ring, a pearl ring, and a saddle support can be provided with.

A temperature in distillation is preferably in the range of 0 to 70° C., more preferably in the range of 5 to 60° C. at a column bottom section. In a case that a temperature at a column bottom section is higher than 70° C., a problem such as a decomposition of hydroxylamine may occur. On the other hand, in a case that a temperature at a column bottom section is lower than 0° C., a problem in which a large amount of energy is required for cooling may occur.

A pressure of distillation, which is determined depending on a relationship with a temperature, is preferably in the range of 0.5 to 60 kPa, more preferably in the range of 0.8 to 40 kPa at a column bottom section.

A part of a hydroxylamine solution that has been obtained in the above concentration process can be used as a solvent that dissolves or suspends a salt of hydroxylamine and an alkali compound, which are raw materials for the reaction.

A hydroxylamine solution with a low concentration can be obtained from the top or side of a distilling column in some cases. A part or the entire of the obtained hydroxylamine solution can be used as a solvent that dissolves or suspends a salt of hydroxylamine and an alkali compound, which are raw materials for the reaction.

The concentration process is preferably carried out in the presence of a stabilizer of hydroxylamine similarly to the reaction process. In the concentration process, a new stabilizer can be added, or a stabilizer that has been used in the previous process can also be used.

For the stabilizer, a stabilizer can be selected from same or different types of the stabilizers used in the reaction process depending on the conditions and applications. By adding a stabilizer, a side reaction such as decomposition of hydroxylamine due to metal impurities or the like can be suppressed and production efficiency of hydroxylamine can be improved.

An amount of a stabilizer is suitably used in such a manner that a mass ratio of a stabilizer to hydroxylamine (stabilizer/hydroxylamine) is in the range of $1.0 \times 10^{-9}$ to 1.0, preferably in the range of $1.0 \times 10^{-8}$ to 0.1. In a case that the above mass ratio is less than $1.0 \times 10^{-9}$, an effect of suppressing the decomposition reaction of hydroxylamine due to metal impurities cannot be obtained in some cases. In a case that the above mass ratio is larger than 1.0, it is necessary to remove or recover excess stabilizers in some cases.

The concentration process for concentrating hydroxylamine at a column bottom section by distillation in a method for manufacturing hydroxylamine can be carried out by a known method such as a batch system, a semi-batch system and a continuous system.

Moreover, a method for manufacturing hydroxylamine can include, a process for purifying hydroxylamine, which has been obtained in the above concentration process, by an ion exchange.

The method of an ion exchange can be carried out by a known method such as a cation exchange, an anion exchange and a chelate exchange.

The purification by a cation exchange can be carried out by a known method using a strong acid cation exchange resin, a weak acid cation exchange resin or the like. An acid treatment is preferably carried out to the cation exchange resin in advance to make the cation exchange resin to be an H type before being used.

The purification by an anion exchange can be carried out by a known method using a strong basic anion exchange resin, a weak basic anion exchange resin or the like. An alkali treatment is preferably carried out to the anion exchange resin in advance to make the anion exchange resin to be an OH type before being used.

The purification by a chelate exchange can be carried out by a known method using a chelate exchange resin or the like. An acid treatment is preferably carried out to the chelate exchange resin in advance to make the chelate exchange resin to be an H type before being used.

The purification can be carried out by combining a cation exchange, an anion exchange and a chelate exchange. For instance, the anion exchange can be carried out after the cation exchange, or the cation exchange can be carried out after the anion exchange.

Moreover, a mono bed resin or a mix bed resin in which a cation exchange resin and an anion exchange resin are mixed can also be used.

A temperature in an ion exchange is preferably in the range of 0 to 70° C., more preferably in the range of 5 to 50° C. In a case that a temperature in an ion exchange is higher than 70° C., a problem such as a decomposition of hydroxylamine may occur. On the other hand, in a case that a temperature in an ion exchange is lower than 0° C., a problem in which energy required for cooling becomes larger may occur.

A part of a hydroxylamine solution obtained in the above purification process can be used as a solvent that dissolves or suspends a salt of hydroxylamine and an alkali compound, which are raw materials for the reaction.

The above purification process is preferably carried out in the presence of a stabilizer of hydroxylamine similarly to the reaction process. In the purification process, a new stabilizer can be added, or a stabilizer that has been used in the previous process can also be used.

For the stabilizer, a stabilizer can be selected from same or different types of the stabilizers used in the reaction process depending on the conditions and applications. By adding a stabilizer, a side reaction such as decomposition of hydroxylamine due to metal impurities or the like can be suppressed and production efficiency of hydroxylamine can be improved.

An amount of a stabilizer is suitably used in such a manner that a mass ratio of a stabilizer to hydroxylamine (stabilizer/hydroxylamine) is in the range of $1.0 \times 10^{-9}$ to 1.0, preferably in the range of $1.0 \times 10^{-8}$ to 0.1. In a case that the above mass ratio is less than $1.0 \times 10^{-9}$, an effect of suppressing a decomposition reaction of hydroxylamine due to metal impurities cannot be obtained in some cases. In a case that the above mass ratio is larger than 1.0, it is necessary to remove or recover excess stabilizers in some cases.

As described above, a method for manufacturing hydroxylamine that can be used for the stabilizing method related to the present invention includes, for instance, (1) a reaction process for reacting a salt of hydroxylamine with an alkali compound in order to obtain hydroxylamine,
(2) a process for separating hydroxylamine and an insoluble material,
(3) a purification process for purifying hydroxylamine by an ion exchange, and
(4) a concentration process for concentrating hydroxylamine at a column bottom section by distillation.

The above processes are preferably carried out in the order of the reaction process, the separation process, the purification process, and the concentration process. Moreover, after the above process (1) is carried out, the processes (2) to (4) can be carried out in any order. In addition, the same process can be carried out twice or more.

For instance, a concentration of hydroxylamine that can be obtained by using the above method is 10 mass % or higher. Moreover, it is possible to obtain hydroxylamine with a concentration of 20 mass % or higher. Furthermore, it is also possible to obtain hydroxylamine with a concentration of 40 mass % or higher.

For hydroxylamine that can be obtained by using the above method, the content of each metal contained as impurities is, for instance, 1 mass ppm or less. Moreover, it is possible to obtain hydroxylamine with a content of each metal of 0.1 mass ppm or less. Furthermore, it is also possible to obtain hydroxylamine with a content of each metal of 0.01 mass ppm or less. As a metal, there are mentioned an alkali metal and an alkaline earth metal that derive from an alkali compound used in the reaction process, and Fe that remarkably accelerates a decomposition of hydroxylamine.

For hydroxylamine that can be obtained by using the above method, the content of each anion contained as impurities is, for instance, 100 mass ppm or less. Moreover, it is possible to obtain hydroxylamine with a content of each anion of 10 mass ppm or less. Furthermore, it is also possible to obtain hydroxylamine with a content of each anion of 1 mass ppm or less. As an anion, there are mentioned a sulfate ion, a chloride ion, a nitrate ion and so on that derive from a salt of hydroxylamine, which is a raw material.

chloric acid, and a decomposition rate of hydroxylamine was obtained by the following expression.

Decomposition rate of hydroxylamine (%)=(50−$A$)/ 50×100 $A$=concentration of hydroxylamine (mass %) after 30 days elapsed The results are listed in Table 1.

Comparative Examples 1 to 3

Comparative examples 1 to 3 were carried out similarly to embodiments 1 and 2 except that a preservation stabilizer listed in Table 1 was added in place of ethylenediamine-N,N'-di(o-hydroxyphenylacetic acid) as a preservation stabilizer.

The results are listed in Table 1.

TABLE 1

| Embodiment | Preservation stabilizer | Concentration of a preservation stabilizer (Mass ppm) | Decomposition rate of hydroxylamine (%) |
|---|---|---|---|
| 1 | Ethylenediamine-N,N'-di (o-hydroxyphenylacetic acid) | 300 | 5.4 |
| 2 | Ethylenediamine-N,N'-di (o-hydroxyphenylacetic acid) | 500 | 6.1 |
| Comparative example 1 | None | 0 | 12 |
| Comparative example 2 | Diethylenetriamine-pentaacetic acid | 300 | 7.7 |
| Comparative example 3 | Triethylenetetramine-hexaacetic acid | 300 | 10 |

In a case that ethylenediamine-N,N'-di(o-hydroxyphenylacetic acid) is used in any of the above processes (1) to (4), ethylenediamine-N,N'-di(o-hydroxyphenylacetic acid) is not required to be removed or recovered, and can also be used as a preservation stabilizer. In this case, an amount of ethylenediamine-N,N'-di(o-hydroxyphenylacetic acid) to be added as a preservation stabilizer is set by including an amount of ethylenediamine-N,N'-di(o-hydroxyphenylacetic acid) that exists in a solution in advance.

Embodiments

The present invention will be described below in detail by using embodiments and comparative examples. However, the present invention is not restricted to the embodiments.

Embodiments 1 and 2

The ethylenediamine-N,N'-di(o-hydroxyphenylacetic acid) was added as a preservation stabilizer into a 50 mass % hydroxylamine aqueous solution with an Fe concentration of 0.01 mass ppm or less in such a manner that the 50 mass % hydroxylamine aqueous solution contains ethylenediamine-N,N'-di(o-hydroxyphenylacetic acid) of the specified concentration.

The above 50 mass % hydroxylamine aqueous solution of 100 g was filled into a 500 ml container made of PFA with a cover, and the container to which the cover was set was installed to a thermostatic chamber of 60° C.

The coloring of the hydroxylamine aqueous solution was visually confirmed after 30 days elapsed. A concentration of hydroxylamine was then measured by the titration of hydro- Embodiments 3 and 4

The ethylenediamine-N,N'-di(o-hydroxyphenylacetic acid) was added as a preservation stabilizer into a 50 mass % hydroxylamine aqueous solution with an Fe concentration of 0.01 mass ppm or less in such a manner that the 50 mass % hydroxylamine aqueous solution contains ethylenediamine-N,N'-di(o-hydroxyphenylacetic acid) of the specified concentration.

The above 50 mass % hydroxylamine aqueous solution of 20 g was filled into a 500 ml container made of PFA with a cover.

The standard solution of 1000 mg/L of Fe (III) was added into the 50 mass % hydroxylamine aqueous solution in such a manner that an Fe content becomes the specified concentration. The cover was then set to the container, and the container was installed to a thermostatic chamber of 50° C.

After 7 days elapsed, a concentration of hydroxylamine was measured by the titration of hydrochloric acid, and a decomposition rate of hydroxylamine was obtained by the following expression.

Decomposition rate of hydroxylamine (%)=(50−$B$)/ 50×100 $B$=concentration of hydroxylamine (mass %) after 7 days elapsed The results are listed in Table 2.

Comparative Examples 4 to 6

Comparative examples 4 to 6 were carried out similarly to embodiments 3 and 4 except that a preservation stabilizer listed in Table 2 was added in place of ethylenediamine-N,N'-di(o-hydroxyphenylacetic acid) as a preservation stabilizer.

TABLE 2

| Embodiment | Preservation stabilizer | Concentration of a preservation stabilizer (Mass ppm) | Concentration of Fe (III) (Mass ppm) | Decomposition rate of hydroxylamine (%) |
|---|---|---|---|---|
| 3 | Ethylenediamine-N,N'-di(o-hydroxyphenylacetic acid) | 300 | 1.0 | 1.1 |
| 4 | Ethylenediamine-N,N'-di(o-hydroxyphenylacetic acid) | 500 | 1.0 | 0.45 |
| Comparative example 4 | None | 0 | 1.0 | 100 |
| Comparative example 5 | Diethylenetriamine-pentaacetic acid | 300 | 1.0 | 70 |
| Comparative example 6 | Triethylenetetramine-hexaacetic acid | 300 | 1.0 | 91 |

By the above embodiments and comparative examples, it is found that ethylenediamine-N,N'-di(o-hydroxyphenylacetic acid) as a preservation stabilizer is effective for stabilizing a hydroxylamine aqueous solution in the presence of Fe.

INDUSTRIAL APPLICABILITY

By the present invention, a hydroxylamine solution can be stabilized and a stabilized hydroxylamine solution can be obtained. In particular, by the present invention, since the stability of hydroxylamine is remarkably improved under the condition of a high temperature, a high concentration, and an existence of metal impurities, an application range for applying hydroxylamine to many applications can be enlarged.

The invention claimed is:

1. A method for stabilizing hydroxylamine comprising the step of adding ethylenediamine-N,N'-di(o-hydroxyphenylacetic acid) as a preservation stabilizer into a hydroxylamine solution.

2. A stabilized hydroxylamine solution comprising hydroxylamine and ethylenediamine-N,N'-di(o-hydroxyphenylacetic acid).

3. A stabilizer of hydroxylamine wherein ethylenediamine-N,N'-di(o-hydroxyphenylacetic acid) is an effective component.

* * * * *